Figure 1:
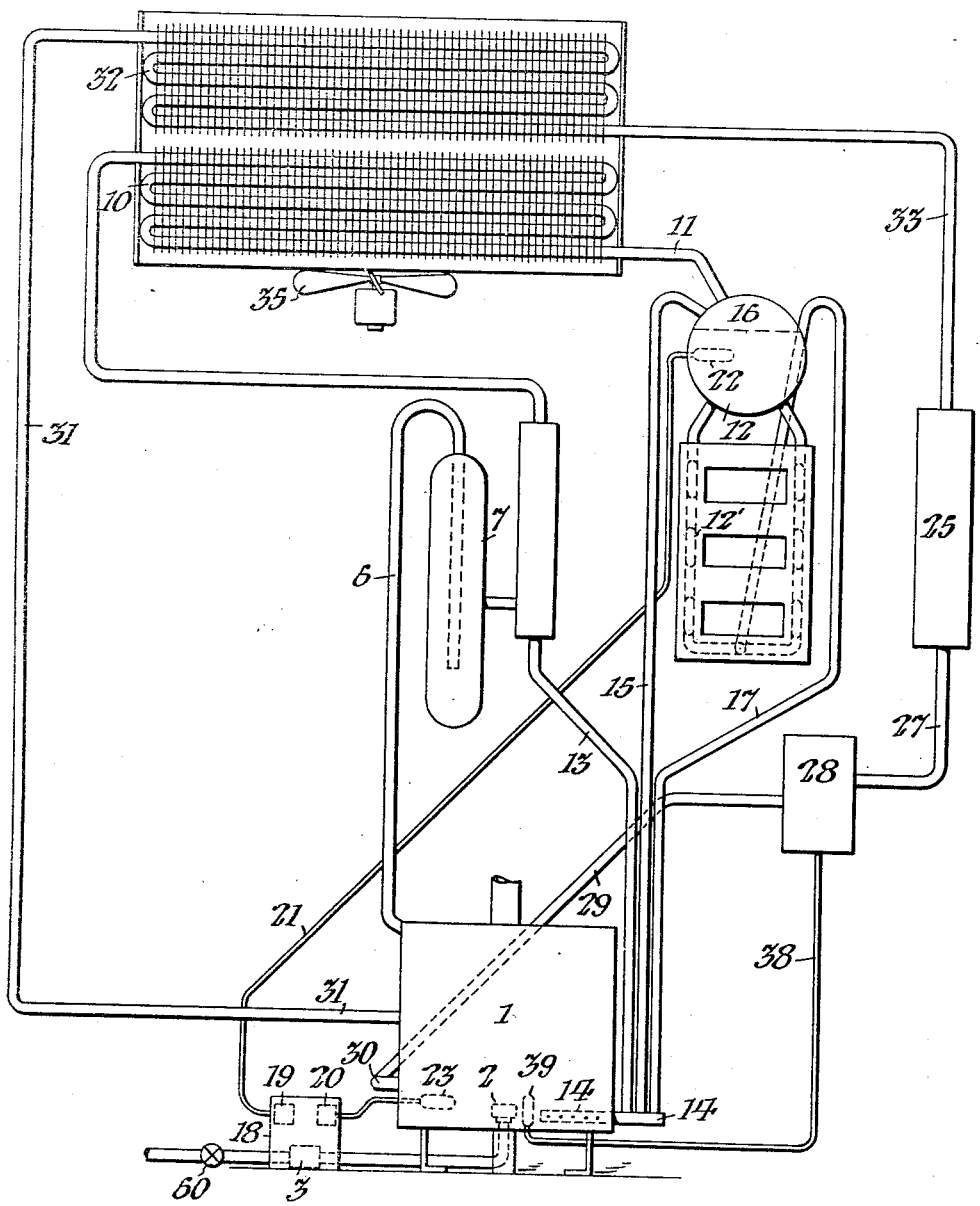

Oct. 10, 1933.     V. MAUCK     1,929,954
REFRIGERATING APPARATUS
Filed April 9, 1931     2 Sheets-Sheet 1

INVENTOR:
VICTOR MAUCK,

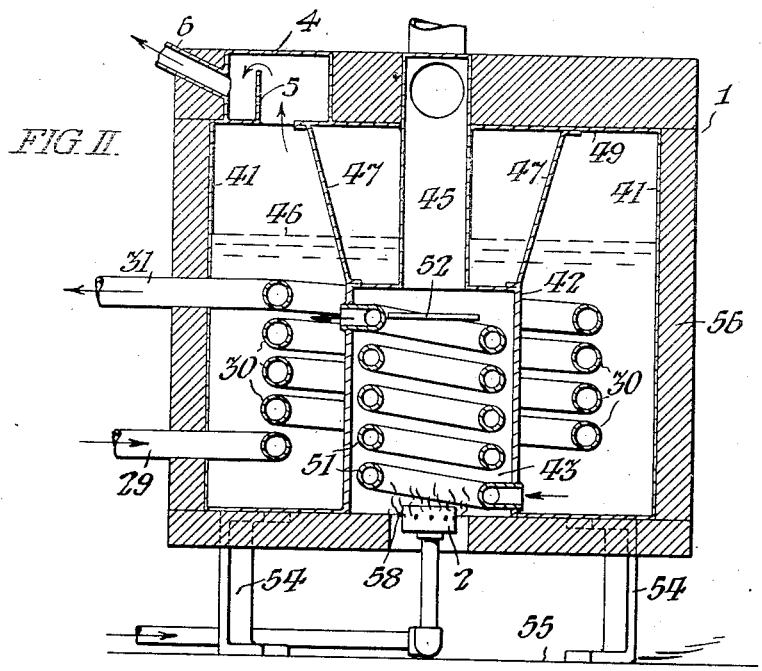
Fig. II.
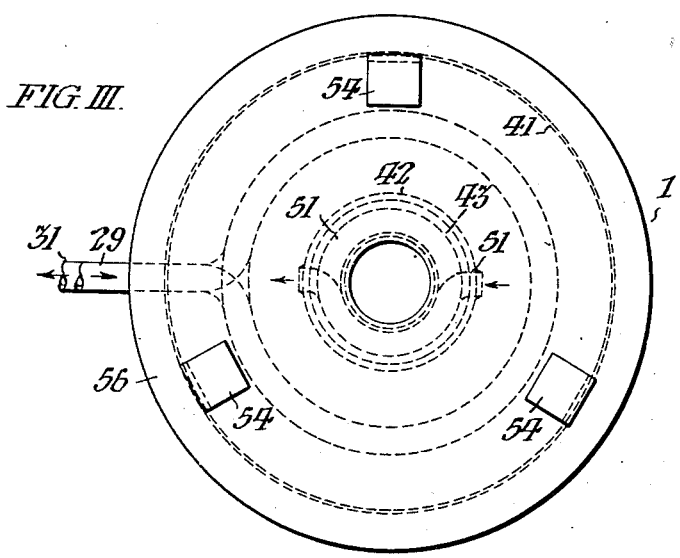
Fig. III.
INVENTOR:
Victor Mauck,

Patented Oct. 10, 1933

1,929,954

UNITED STATES PATENT OFFICE 1,929,954

REFRIGERATING APPARATUS

Victor Mauck, Bryn Mawr, Pa., assignor to Master Domestic Refrigerating Company, Inc., Conshohocken, Pa., a corporation of New York Application April 9, 1931. Serial No. 528,749

5 Claims. (Cl. 62—118)

My invention relates to refrigerating systems of the absorption type, wherein evaporation of a liqueflable refrigerant is effected by means of a gas burner, and particularly to such apparatus including a circulating system for a main refrigerant, such as ammonia, and an auxiliary circulating system for an auxiliary refrigerant such as ethyl chloride, for cooling the ammonia generator after each interval in which said generator is heated.

It has been the general practice to form such a generator of a cylindrical container for the ammonium hydroxide, disposed with its axis horizontal above a burner substantially coextensive with the length of said container, and to inclose the container and burner in a jacket permitting circulation of the products of combustion over the exterior surface of the container in the base of the casing containing a compartment for the food or other material which it is desired to refrigerate. However, I have discovered that with a generator thus constructed and arranged the heating efficiency of the gas burner is less than twenty-five per cent., of the British thermal unit rating of the gas consumed, and a large percentage of the heat generated is dissipated within the refrigerator casing and absorbed by the latter and its contents with consequent diminution of the refrigerating efficiency of the apparatus. Therefore, the principal objects of my present invention are to so construct and arrange a refrigerant generator of the absorption type as to, first, greatly increase the heating efficiency of a gas burner with respect thereto and, second, to prevent the dissipation of heat therefrom to the material to be refrigerated.

The essential feature of my invention is that combustion of the gas is effected in a combustion chamber formed within the liquid refrigerant container. As hereinafter described; said combustion chamber preferably incloses a conduit helically coiled, with its axis vertical, and with its upper and lower ends in communication with said container; so that the convection currents induced in said coil by the heat of the gas burner cause the liquefied refrigerant to be forcibly circulated in said container and through said coil in the combustion chamber, and the products of combustion are discharged from said chamber through a flue which extends through said liquid container. Moreover, the outer surface of said container is secluded in an efficient heat insulating casing which prevents dissipation of the heat from the container to the atmosphere surrounding it in said refrigerator casing. The secondary refrigerant is circulated through a coil surrounding the combustion chamber in said container and within the latter, in coaxial relation with said coil in the combustion chamber, and the upper and lower ends of said secondary refrigerant coil are extended through said heat insulating casing to means for effecting such circulation.

My invention includes the various novel features of construction and arrangement hereinafter more definitely specified.

In said drawings; Fig. I is a diagrammatic elevation of a refrigerating system, comprising a main refrigerant circulating system of the absorption type including my improved generator and its appurtenances, and a secondary circulating system for cooling said generator in the intervals between heating operations thereof. Fig. II is a vertical sectional view of said generator indicated in Fig. I. Fig. III is an inverted plan view.

In said drawings; the main refrigerant generator includes the container 1 which is arranged to be intermittently heated by the gas burner 2 controlled by the automatically operative valve 3. Said container 1 is part of a closed circulatory system for the main refrigerant, for instance, aqua ammonia, and which includes the trap 4 with the baffle plate 5 obstructing the lower end of the refrigerant vapor outlet conduit 6 leading through the rectifier 7 to the condenser 10, and the conduit 11 leading to the evaporator including the cylindrical drum 12 and the coil 12' in the inclosure to be refrigerated. The purpose and effect of said rectifier is to separate any entrained liquid from the vapor of the main refrigerant so that it may be returned to said container 1, through the conduit 13 and the manifold 14, which latter extends in said container 1 where it is perforated to distribute the liquid returned therethrough. Said manifold is also connected with the conduit 15 which is in communication with the vapor space 16 above the liquid refrigerant condensate in said evaporator 12 and is also connected with the conduit 17 which extends above the level of said liquid in the evaporator from the bottom of said coil 12'.

Said burner control valve 3 is arranged to be opened and closed by mechanism in the casing 18 under control of alternately expansible devices 19 and 20, for instance, corrugated metal bellows; said bellows 19 being operatively connected, by the conduit 21, with the thermostatic bulb 22 which is subject to the temperature of the main refrigerant, conveniently in the evaporator 12; so that said burner valve 3 is opened to heat the generator container 1 when said bulb 22 reaches a predetermined temperature which is relatively high for the refrigerated inclosure. Said bellows 20 is operatively connected with the thermostatic bulb 23 in said container 1, so that said burner valve 3 is closed when said bulb 23 reaches a predetermined temperature which is relatively high for the contents of said container.

For the purpose of cooling the contents of said container 1 between successive heating operations thereof; I provide a secondary closed circuit including the liquid trap 25 containing a secondary refrigerant having a low boiling point, for instance, ethyl chloride. Said secondary circuit includes the conduit 27 controlled by the valve 28 which controls the circulation of the secondary refrigerant and which has the outlet conduit 29 extending to the coil 30 in said generator container 1; whereby, when said valve 28 is closed, said secondary refrigerant, in a liquid state, is excluded from said coil 30 extending in said container 1. However, said coil 30 is connected by the conduit 31 with the radiator 32 which is connected by the conduit 33 with said trap 25. When said valve 28 is opened, said secondary refrigerant may gravitate from said trap 25 into said coil 30 and be boiled by the heat which it absorbs from the hot primary refrigerant aqueous residue in said generator container 1, and, being thus vaporized, said secondary refrigerant may be recondensed to the liquid state in said radiator 32, conveniently by subjecting the latter to a draft of atmospheric air from the fan 35, which also dissipates the heat from said condenser 10 in the main refrigerant circuit.

Said valve 28 is adapted to be thermostatically controlled by way of the conduit 38 terminating in the bulb 39 which may be located anywhere it may be subjected to the heat from the burner 2. Said valve 28 may be constructed and arranged as described and claimed in copending application Serial No. 486,879 filed October 7, 1930, for Archie Hugh Strong's Improvement in refrigerating apparatus, of which I am a part owner. The combination of the coils 10 and 32 with the fan 35 or equivalent means for forcibly cooling them is claimed in said copending application.

Referring to Fig. II; said container 1 of the refrigerant generator includes a cylindrical vertical shell 41 having the cylindrical vertical shell 42 in coaxial relation therewith and forming the combustion chamber 43 in said container 1 which is connected with the flue 45 extending through said container 1 and through which the products of combustion from the burner 2 escape. The aqua ammonia or other liquefied refrigerant 46 in said container 1 may be at a temperature of 260° F., at one point in the heating cycle. Therefore, I prefer to provide the reinforcing members 47 which extend diagonally from the upper edge of said shell 42 to the top plate 49 of said container 1 and serve to maintain the latter in the position shown despite such fluid pressure as is incident to the intermittent heating of said refrigerant.

As above contemplated, I prefer to include in said combustion chamber 43 the helically coiled conduit 51 with its upper and lower ends in communication with the refrigerant space in said container 1. Of course, the operation of said burner 2 highly heats the lower convolutions of said coil 51 with the effect of inducing convection currents of the refrigerant liquid upward therein and thus forcibly circulates said liquid in the container 1. Said shell 42 is terminated intermediate of the height of the container shell 41 and the flue 45 made of less diameter than said combustion chamber 43 to retard the escape of the products of combustion below the level of the liquid 46. I prefer to also provide said combustion chamber 43 with the baffle plate 52 below the outlet to said flue 45 so as to retard the flow of products of combustion from said chamber 43 until they are practically deprived of heat by absorption thereof into the fluid within said container 1.

In order to afford convenient access to said burner 2; I prefer to support said container 1 upon a plurality of legs 54 which uphold said container in spaced relation with the base support 55. The outer surface of said container 1 is secluded in the heat insulating casing 56 which may be formed of fibrous cellular material or any suitable medium which prevents dissipation of the heat from the container to the atmosphere surrounding it in the refrigerator casing in which said container is conveniently mounted below said evaporator 12. As shown in Fig. II, said insulating casing 56 is preferably formed in three parts to facilitate its application to the metal structure above described; to wit, first, a cylindrical tube surrounding the outer metal shell 41 with openings therethrough for the ends 29 and 31 of the cooling medium coil; second, a circular disk with an axial opening for said burner 2 and forming a closure for the bottom of said casing 56; and, third, another circular disk having an axial opening for said flue 45, and a lateral opening for said refrigerant vapor outlet 6, and forming a closure for the top of said insulating casing 56.

Said apparatus operates as follows: The burner 2 being lighted, the flames 58 heat the refrigerant liquid 46 in said coil 51 and in the container 1 causing vapors thereof to rise through the conduit 6 and rectifier 7 to the coil 10 in which they are condensed to liquid form under the cooling action of the fan 35 and convection currents of air passing upward with respect to said coil, as indicated by the arrows in Fig. I, and the refrigerant condensate passes into said evaporator from which it is subsequently evaporated by the absorption of heat from the atmosphere surrounding said evaporator in the food compartment of the refrigerator casing which is to be cooled. When the liquid residue in the container 1 reaches the high temperature for which the apparatus has been calibrated, the fluid heated in the bulb 23 operates the bellows 20 to reduce the flow of gas through the valve 3 to said burner 2. Contemporaneously, the thermostatic bulb 39 and its appurtenances automatically open the valve 28 permitting the secondary refrigerant to gravitate, in liquid form, from the trap 25 into the coil 30 in which it evaporates as it absorbs heat from the liquid residue of the primary refrigerant in said container 1. The vapor of the secondary refrigerant rises through the conduit 31 to the coil 32 where it is again condensed by the convection air currents supplemented by the operation of said fan 35 and passes thence in liquid form back to the trap 25. Such cooling of the liquid residue of the primary refrigerant in said container 1 permits the vapor of the primary refrigerant to pass back into the container 1 as it boils off from the evaporator 12 until the rate of such evaporation is insufficient to maintain the desired low temperature at the evaporator. When, by absorption of heat from the atmosphere surrounding said evaporator 12 which the latter is designed to cool, the thermostatic bulb 22 at the evaporator is subjected to temperature above that for which it is calibrated; said bulb 22 and its appurtenances including the bellows 19 again open the gas valve 3 to start another cycle at the generator 1. Such cycles are repeated until the supply of gas is shut off, conveniently by the manually operative valve 60, if and when it is desired to terminate the operation of the refrigerating apparatus.

However, it is to be understood that my improved generator, exemplified in Fig. II, may be embodied in refrigerating apparatus constructed and arranged otherwise than as indicated in Fig. I. Therefore, I do not desire to limit myself to the precise details of construction, arrangement, or method of operation herein set forth as it is obvious that various modifications may be made therein without departing from the essential features of my invention, as defined in the appended claims.

I claim:

1. In refrigerating apparatus of the absorption type; a generator absorber including a cylindrical shell mounted with its axis vertical; a second cylindrical shell within said first shell, in coaxial spaced relation therewith, and terminating intermediate of the height thereof, forming a combustion chamber; a flue of less diameter than said combustion chamber, extending in coaxial relation with said chamber from the top thereof through said outer shell and in communication with the atmosphere; a baffle plate in said combustion chamber beneath said flue; a coil in said combustion chamber in communication with the space between said shells at both the bottom and top thereof; a gas burner at the lower end of said combustion chamber for heating said coil; a coil for a cooling medium mounted in the space between said shells and having its upper and lower ends extending through the outer shell; a refrigerant fluid in the space between said shells; a refrigerant vapor outlet at the top of said space; and a baffle plate local to said outlet for preventing escape of liquid through said refrigerant outlet.

2. A structure as in claim 1, including a heat insulating casing formed of fibrous cellular material and comprising a cylindrical tube surrounding said outer shell with openings therethrough for the ends of the cooling medium coil, a circular disk with an axial opening for said burner and forming a closure for the bottom of said insulating casing, and another circular disk having an axial opening for said flue and a lateral opening for said refrigerant vapor outlet and forming a closure for the top of said insulating casing.

3. Apparatus as in claim 1, including a thermostatic element immersed in the fluid between said shells; and a valve in cooperative relation with said thermostatic element for controlling the supply of gas to said burner.

4. In refrigerating apparatus of the absorption type; a generator absorber including an outer shell; a second shell within said first shell, terminating intermediate of the height thereof and forming a combustion chamber; a flue of less diameter than said combustion chamber, extending from the top of said chamber through said outer shell and in communication with the atmosphere; a coil in said combustion chamber in communication with the space between said shells at both the bottom and the top thereof; a burner at the lower end of said combustion chamber for heating said coil; a coil for a cooling medium mounted in the space between said shells and having its upper and lower ends extending through said outer shell; a refrigerant fluid in the space between said shells; a refrigerant vapor outlet at the top of said space; and means local to said outlet for preventing escape of liquid therethrough.

5. In refrigerating apparatus of the absorption type; a generator absorber including an outer shell; a second shell within said first shell, terminating intermediate of the height thereof and forming a heating chamber; a fluid of less diameter than said heating chamber, extending from the top of said chamber through said outer shell and in communication with the atmosphere; a coil in said heating chamber in communication with the space between said shells at both the bottom and the top thereof; means in said chamber for heating said coil; a coil for a cooling medium mounted in the space between said shells and having its upper and lower ends extending through said outer shell; a refrigerant fluid in the space between said shells; and a refrigerant vapor outlet at the top of said space.

VICTOR MAUCK.